United States Patent [19]

Iwamoto et al.

[11] Patent Number: 4,483,407

[45] Date of Patent: Nov. 20, 1984

[54] VARIABLE CONFIGURATION TRACK LAYING VEHICLE

[75] Inventors: Taro Iwamoto, Mito; Hiroshi Yamamoto, Ibaraki, both of Japan

[73] Assignee: Hitachi, Ltd., Tokyo, Japan

[21] Appl. No.: 476,271

[22] Filed: Mar. 17, 1983

[30] Foreign Application Priority Data

Mar. 26, 1982 [JP] Japan .................................. 57-47177
Aug. 27, 1982 [JP] Japan .................................. 57-147627

[51] Int. Cl.³ .............................................. B62D 55/00
[52] U.S. Cl. ..................................... 180/9.5; 180/6.54;
180/6.7; 180/9.1; 180/9.23; 180/907; 280/5.22;
280/DIG. 10; 301/5 P; 305/29; 305/35 EB;
901/1
[58] Field of Search ................ 180/9.2 R, 9.2 C, 9.22,
180/9.23, 9.24 R, 9.24 A, 9.26, 9.28, 9.3, 9.32,
9.34, 9.36, 9.38, 9.4, 9.42, 9.46, 9.48, 9.5, 9.52,
9.54, 9.56, 9.58, 9.6, 9.62, 9.64, 10, 8 R, 8 H, 8.1,
DIG. 1, DIG. 3, 6.5, 6.7, 6.2, 6.54, 907;
280/5.22, 211, 657, DIG. 10; 901/1; 301/5 R,
38 R; 305/1-5, 7, 15, 29-32, 46, 50, 53, 57, 60

[56] References Cited

U.S. PATENT DOCUMENTS

| | | | |
|---|---|---|---|
| 3,057,319 | 10/1962 | Wagner | 180/9.32 X |
| 3,231,036 | 1/1966 | Appenrodt | 180/6.5 |
| 3,231,290 | 1/1966 | Weyer | 280/5.22 |
| 3,276,531 | 10/1966 | Hale et al. | 180/6.5 X |
| 3,529,688 | 9/1970 | Bruce | 180/9.23 |
| 3,533,483 | 10/1970 | Ballinger | 180/9.38 |
| 4,119,163 | 10/1978 | Ball | 180/6.5 |

FOREIGN PATENT DOCUMENTS

138071 10/1981 Japan .................................. 180/8 A

Primary Examiner—Joseph F. Peters, Jr.
Assistant Examiner—Mitchell J. Hill
Attorney, Agent, or Firm—Antonelli, Terry & Wands

[57] ABSTRACT

A vehicle has a pair of endless tracks each extending around a series of wheels arranged in a plane adjacent to one side of the vehicle body. One of the series of wheels on each side of the vehicle body is movable relative to the vehicle body to a selected position to vary the configuration of the endless track in side view so that the vehicle is given a superior running performance and is freely movable along paths having various obstacles.

8 Claims, 20 Drawing Figures

VARIABLE CONFIGURATION TRACK LAYING VEHICLE

BACKGROUND OF THE INVENTION

1. Field of the Invention

The present invention relates to a vehicle having crawlers or endless tracks and, more particularly, to a vehicle suited for going up stairs and running along paths having various obstacles.

2. Description of the Prior Art

Endless tracks on tanks and bulldozers are known as means for enabling these vehicles to run on rough roads or off-roads. The endless tracks are quite effective when the vehicle runs on soft grounds or slopes, but are quite unsuited to go up and down stairs. Namely, when a vehicle having endless tracks starts to ascend stairs, the lugs on the endless belts engage the front edge of the first step of stairs to produce a force to lift the front wheels because the level of the path along which the vehicle runs is discontinuously raised by the first step of the stairs. In this state, the front wheels and, hence, the lugs on the endless tracks engaging the edge of the first step bear a large part of the weight of the vehicle, so that the endless tracks and the edge of the step tend to be damaged or crushed. In such a case, it is not easy for the vehicle to start running up the stairs. During ascending or descending stairs, the vehicle body is placed on the front edges of the steps and thus is inclined to the horizontal. If the stair has a large gradient, therefore, the vehicle may roll down due to unbalance of the weight. To obviate such an accident, it is an effective measure to make the endless tracks have larger lengths. The increased lengths of the endless tracks, however, will increase the resistance encountered when the vehicle turns to the left or right during running.

Under this circumstance, Japanese Patent Laid-Open Publication No. 138071/1981 proposes a vehicle which can freely run on stairs or off-roads having obstacles.

Vehicles of this kind may be used as a running system for maintenance or inspection of equipments in buildings or factories. In order to conduct and accomplish various maintenance and inspection satisfactorily, this type of vehicle is required to have increased freedom of mobility.

SUMMARY OF THE INVENTION

Accordingly, an object of the invention is to provide a compact vehicle having a simple construction and capable of running freely in indoor areas.

Another object of the invention is to provide a vehicle having superior running performance to clear obstacles.

Still another object of the invention is to provide a vehicle capable of controlling its position as desired during running.

According to the invention, there is provided a variable configuration track laying vehicle comprising a body, a series of wheels disposed at each side of said body and including a driving wheel, a secondary wheel and an auxiliary wheel movable relative to said body within a plane in which said driving wheel and secondary wheels are disposed, a loop of endless track extending around said driving, secondary and auxiliary wheels on each side of said body, and means for moving said auxiliary wheel relative to said body within said plane to vary the configuration of the loop of the endless track.

Other objects, features and advantages of the invention will become clear from the following description with reference to the accompanying drawings.

DESCRIPTION OF PREFERRED EMBODIMENTS

Figure 1:
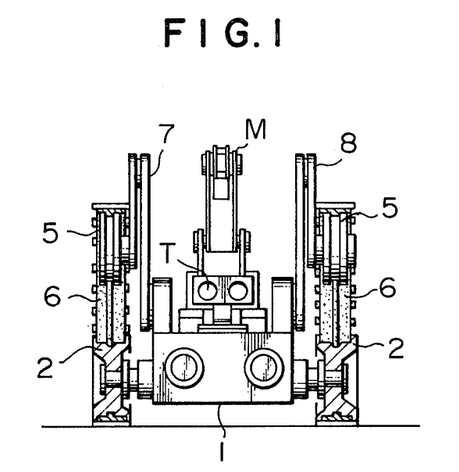
FIG. 1 is a partly sectional front elevational view of a vehicle in accordance with an embodiment of the invention.
Figure 2:
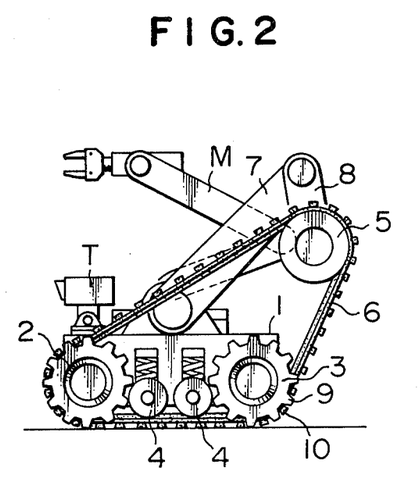
FIG. 2 is a right side elevational view of the embodiment shown in FIG. 1.
Figure 3:
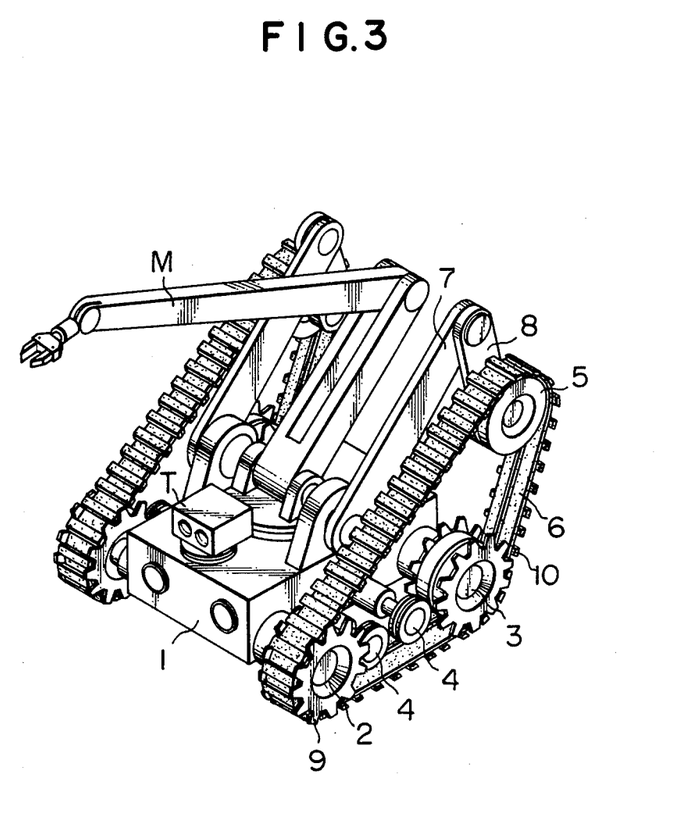
FIG. 3 is a perspective view of the embodiment shown in FIGS. 1 and 2.

Preferred embodiments of the invention will be described hereinunder with reference to the accompanying drawings. FIGS. 1 to 3 show a vehicle in accordance with an embodiment of the invention, the vehicle carrying a manipulator M and TV camera T and being movable in indoor space for inspecting various points therein. In this embodiment, the vehicle is remotecontrolled by an operator who watches the vehicle through the TV camera T. The vehicle is provided on each side thereof with a driving wheel 2, secondary wheel 3, idle wheels 4 and an auxiliary wheel 5. The wheel 2 and/or the wheel 3 is adapted to be driven by an electric motor (not shown) which is energized by a series of batteries (not shown) mounted on the body 1 of the vehicle. Further description concerning the electric driving system is omitted because it does not constitute a part of the invention. The driving wheel 2, the secondary wheel 3 and the idle wheels 4 project laterally from the side of the body 1 and are mounted rotatably on the body 1. The auxiliary wheel 5, which is also disposed at the side of the body 1, is movable by an auxiliary wheel moving means which will be described in detail later. A crawler or endless track 6 extends around the series of wheels, i.e., the driving wheel 2, secondary wheel 3, idle wheels 4 and the auxiliary wheel 5. The auxiliary wheel 5 is mounted on an end of a second arm 8 which is pivotally connected at the other end to a first arm 7 the base end of which is pivotally connected to the body 1. The auxiliary wheel 5, therefore, is movable by the pivotal movements of the first arm 7 and the second arm 8 to keep the endless track 6 tensioned. Thus, the configuration of the endless track as viewed from the lateral side is variable. The driving wheel 2 and/or the secondary wheel 3 is provided with peripheral teeth 9 in meshing engagement with dents 10 on the endless track 6 to drive the endless track 6 thereby to move the vehicle back and forth.

In operation, when the vehicle is operated to run on a flat floor in a building or the like, the auxiliary wheel 5 is lifted above the plane of the floor as shown in FIG. 3 to reduce the area of contact of each endless track 6 to the floor to facilitate steering.

Figure 4:
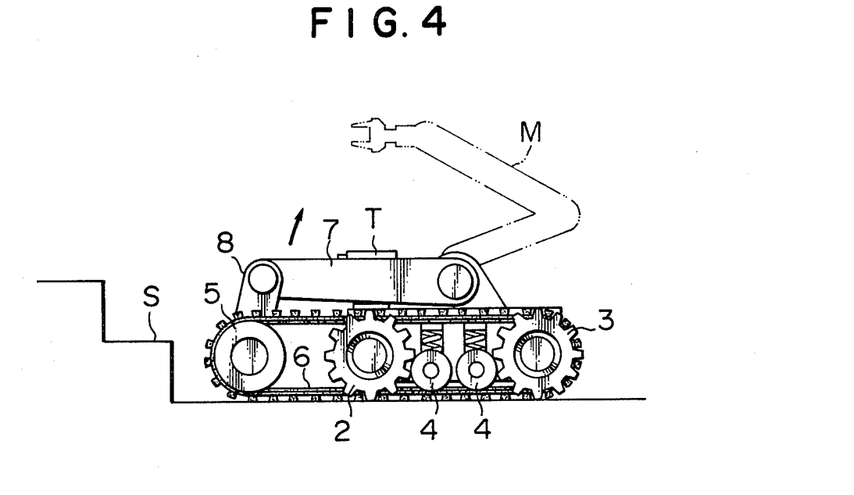
FIGS. 4 to 8 show the vehicle of the embodiment shown in FIGS. 1 to 3 in different positions when it is going to ascend and moves on stairs.
Figure 5:
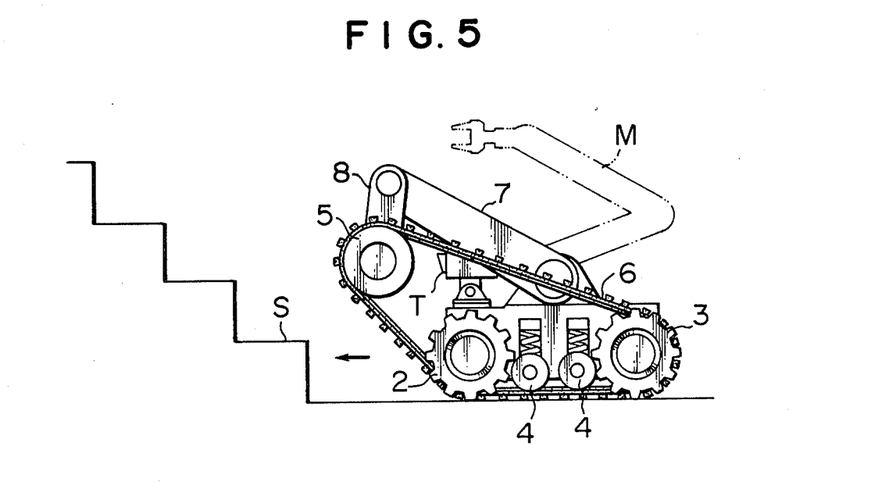
Figure 6:
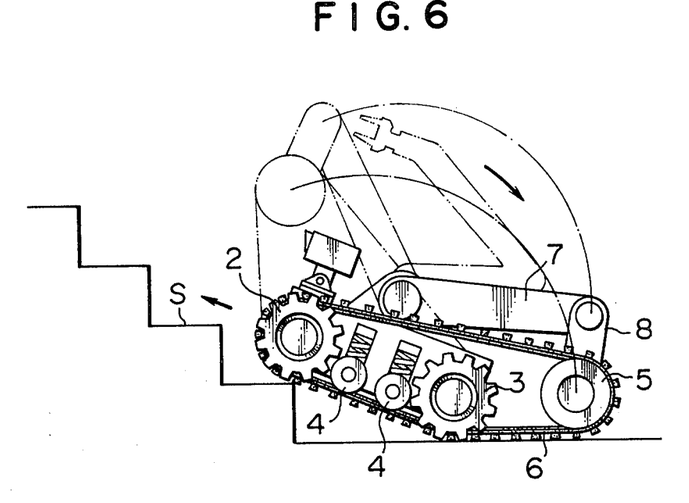
Figure 7:
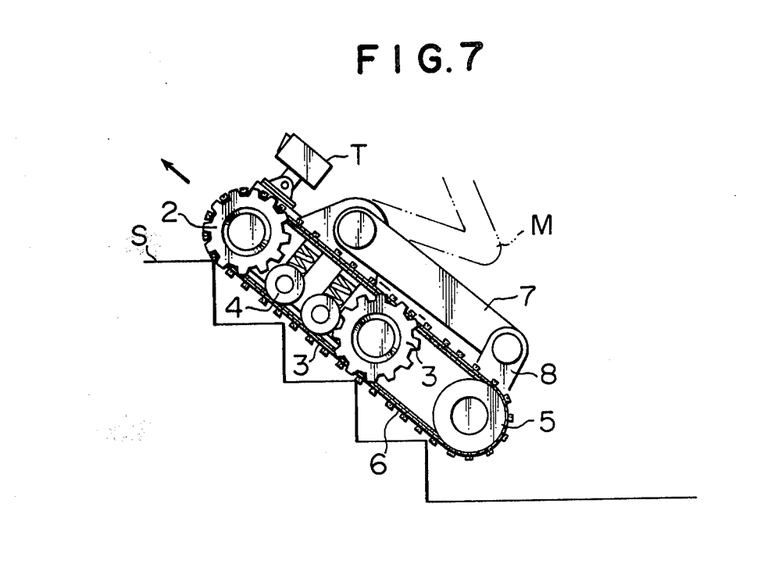
Figure 8:
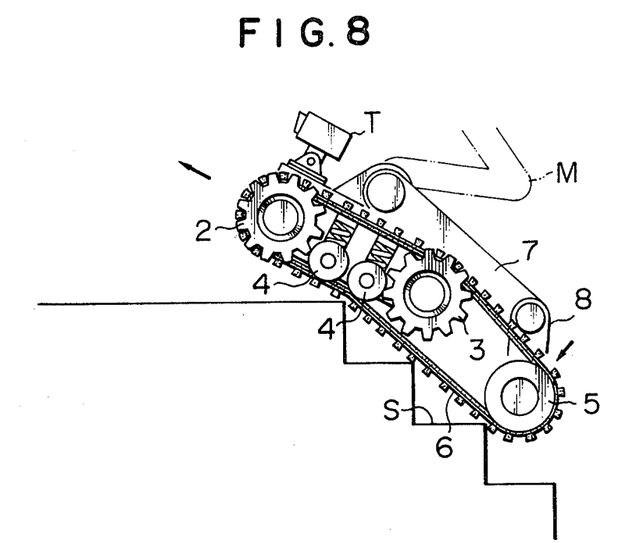

FIGS. 4 to 8 show how the vehicle ascends stairs. When the vehicle 1 has approached the stairs S as shown in FIG. 4, the first arms 7 on both sides of the vehicle are swung as shown in FIG. 5 to lift the auxiliary wheels 5 to facilitate the stepping up of the vehicle to the first step of the stairs S. Then, when the driving wheels 2 have gotten on the first step as shown in FIG. 6, the first arms 7 are swung to the position shown by solid lines in FIG. 6 so that the auxiliary wheels 5 are moved rearwardly to cause the endless tracks 6 to contact with the floor surface thereby to prevent the vehicle from rolling down rearwardly. Then, the driving wheels 2 or the secondary wheels 3 are driven to move the vehicle up the stairs S while the angle of the first arm 7 is varied as shown in FIG. 7 such that the tread surfaces of the endless tracks 6 lay substantially in an inclined common plane. On or adjacent to the uppermost step of the stairs, the first arms 7 are further swung downwardly, as shown in FIG. 8, to assure a safe and stable driving of the vehicle onto the flat floor of an upstairs. It will be clear to those skilled in the art that the reversed steps of operation of the vehicle can be taken to cause the vehicle to move down on the stairs S.

Figure 9:
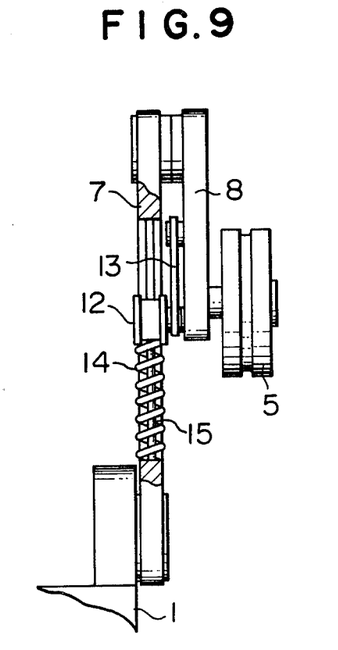
FIG. 9 is a partly sectional front elevational view of an auxiliary wheel moving means incorporated in the embodiment shown in FIGS. 1 to 8.
Figure 10:
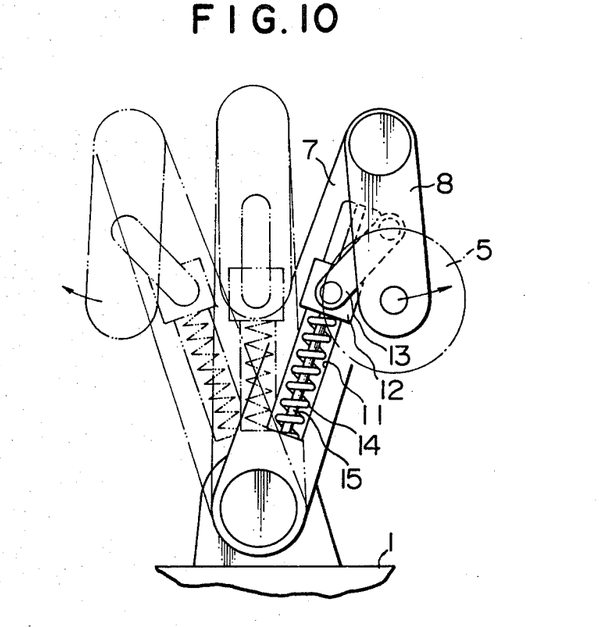
FIG. 10 is a right side elevational view of the auxiliary wheel moving means shown in FIG. 9.

In order to prevent each endless track from coming off from the associated wheels, it is necessary to keep the loop of the endless track tensioned continuously. For this purpose, the auxiliary wheel 5 on each side of the vehicle is forcibly urged outwardly by the second arm 8 from a neutral position which will be referred to later. Needless to say, it is possible to arrange such that the second arms 8 are swung independently by means of an electric motor through chains. The swinging movements of the second arms 8, however, may be provided by a simple mechanism comprising links and springs to be described hereinunder with specific reference to FIGS. 9 and 10. The first arm 7 on each side of the vehicle is formed therein with an elongated channel or slit 11 extending along the longitudinal axis of the arm 7. The elongated slit 11 slidably receives a slide block 12 to which is pivotally connected an end of a link 13 which in turn is pivotally connected at its other end to the second arm 8. The slide block 12 is continuously urged by a spring 14 towards the outer end of the first arm 7. In consequence, a force is generated to swing the auxiliary wheel 5 outwardly from the neutral position where the two arms 7 and 8 are aligned with each other to both end positions where the movement of the second arm 8 is limited by the endless track 6. In order to prevent the buckling of the spring 14, a guide rod 15 extends through the slide block 12 and the spring 14.

As will be understood from the foregoing description, the vehicle of the described embodiment offers the following advantages. The steerability of the vehicle is improved because, during running on a flat ground or floor surface, the length of contact of the endless tracks with the ground or floor surface is shortened to reduce the resistance to the turning force. In addition, the stepping of the vehicle onto the steps of stairs is facilitated because the auxiliary wheels can be moved to assure an easy access of the endless tracks to the first step of the stairs. Furthermore, an accidental rolling-down of the vehicle when the vehicle starts ascending or descending the stairs is avoided because the auxiliary wheels can be swung to cause the endless tracks to provide a good support for the vehicle body on the ground or floor surface. Thus, the described embodiment of the invention provides remarkably improved running performance and mobility of the vehicle in an indoor space.

Figure 11:
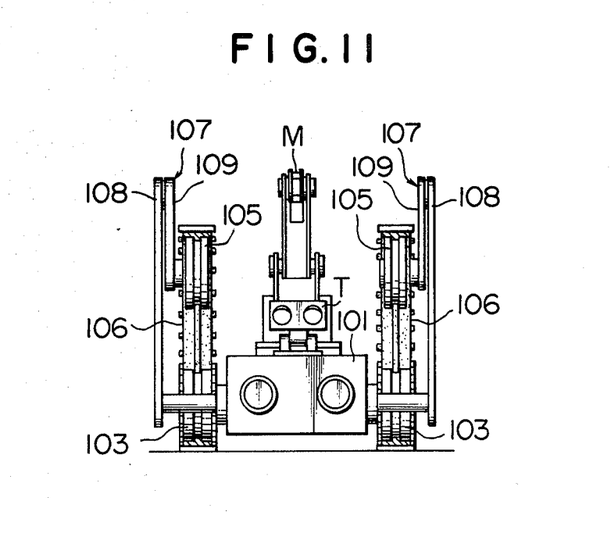
FIG. 11 is a partly sectional front elevational view of another embodiment of the vehicle of the invention.
Figure 12:
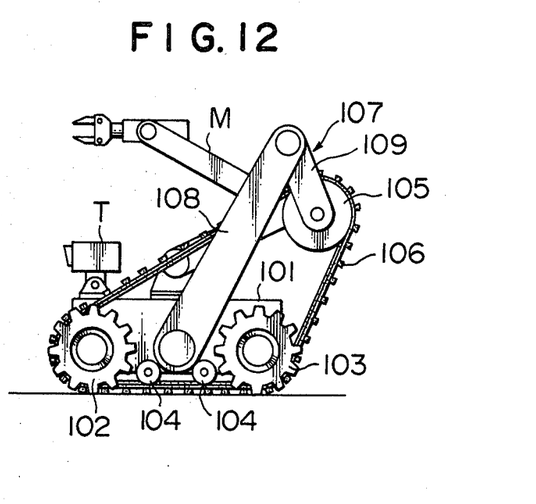
FIG. 12 is a right side elevational view of the embodiment shown in FIG. 11.
Figure 13:
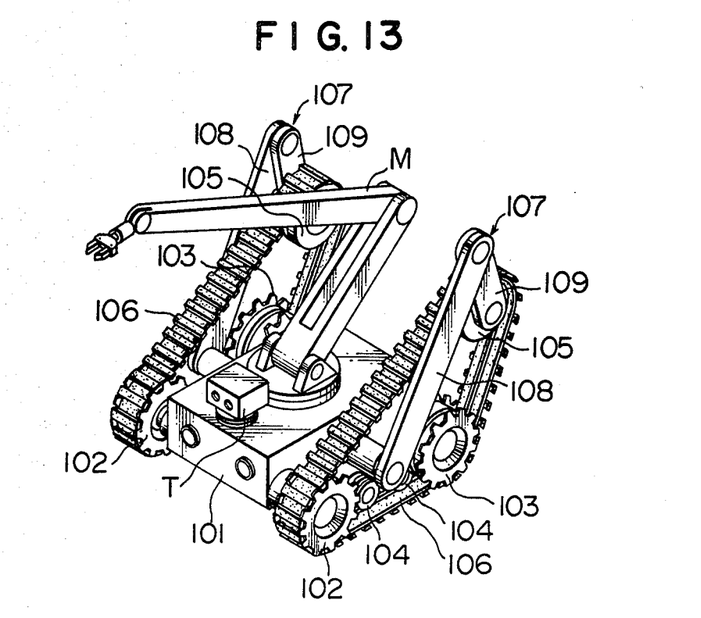
FIG. 13 is a perspective view of the embodiment shown in FIGS. 11 and 12.

FIGS. 11 to 13 show a second embodiment of the vehicle of the invention intended for use as a mobile inspector which is operable to inspect various indoor equipments. For this purpose, the vehicle carries a manipulator M and a TV camara T. The vehicle has a body 101 which is provided on its each side with a driving wheel 102, secondary wheel 103, idle wheels 104 and an auxiliary wheel 105 which is movable with respect to the body 101, and a crawler or endless track 106 extending around the series of wheels 102 to 105. The auxiliary wheel 105 is supported by a supporting means 107 so that the center or axis of the auxiliary wheel 5 is movable along an ellipse having its focal points coincident with the axes of the wheels 102 and 103. The supporting means 107 comprises a first arm 108 and a second arm 109. The first arm 108 is connected to the body 101 of the vehicle for rotation or pivotal movement about an axis located at the mid point of the distance between the axis of the wheels 102 and 103. The second arm 109 is pivotally connected to the free end of the first arm 108. The second arm 109 carries at its free end the auxiliary wheel 105. The dimensional relationship between these elements is determined as follows: Representing the radii of the first arm 108 and the second arm 109 by R and r, respectively, the positions of the axes of the driving wheel 102 and the secondary wheel 103 coincide with the positions of the focal points F of the ellipse when the following condition is met.

$$F = \sqrt{(R + r)^2 - (R - r)^2} \tag{1}$$

$$= 2\sqrt{Rr} \tag{2}$$

The lengths of the first arm 108 and the second arm 109, therefore, are determined to meet the requirements by the formula (2). The diameter of the auxiliary wheel 105 is selected to be equal to the diameters of the wheels 102 and 103.

Figure 14:
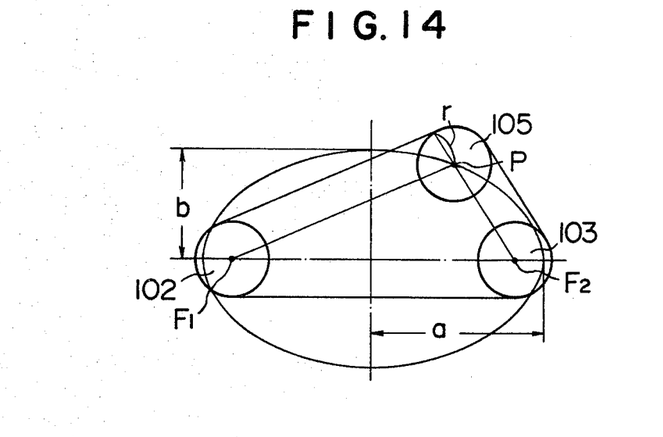
FIG. 14 is an illustration of the principle of movement of the auxiliary wheels incorporated in the embodiment shown in FIGS. 11 to 13.

The principle which permits the movement of the auxiliary wheel 105 along the elliptic path will be described hereinunder with reference to FIGS. 14 and 15.

As is well known, the sum S of the lengths of three sides of a triangle having apexes coinciding with the focal points $F_1$ and $F_2$ of an ellipse and any desired point P on the ellipse is constant. Three circles of the same radius r are drawn around these three points and these circles then are joined by straight lines as shown in FIG. 14. The length L of the periphery of the pattern formed by the circles and the straight lines takes a constant value given $$L = 2\pi r + S \qquad (3)$$

It will be understood that, if the driving and secondary wheels 102 and 103 and the auxiliary wheel 105 are respectively formed by the circles about the focal points $F_1$ and $F_2$ and about the point P and if the endless track 106 extends around the series of these three wheels, the endless track 106 is never slacked but always tensioned with a constant force regardless of the position of the point P on the ellipse insofar as the wheels 102, 103 and 105 have the same equal diameter.

Figure 15:
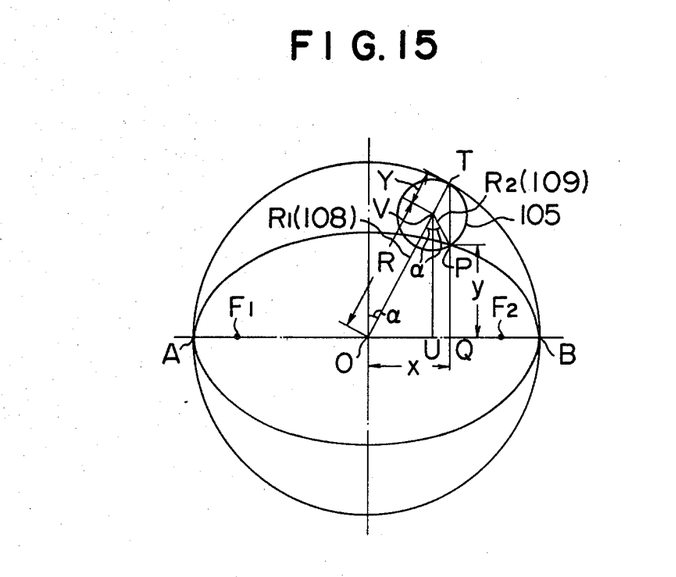
FIG. 15 is an illustration of the path of movement of the auxiliary wheels and the relationship between the angles of rotations of the arms in the embodiment shown in FIGS. 11 to 13.

FIG. 15 shows a radius $R_1$ having a length R and centered at a point 0, a radius $R_2$ having a length r and centered at the end V of the radius $R_1$ and a straight line AB extending through the point 0. The radius $R_1$ makes an angle $\alpha$ with a line which is perpendicular to the line AB and extends through the point 0. The radius $R_2$ makes an angle $2\alpha$ with the radius $R_1$.

The coordinate values (x,y) of the point P shown in FIG. 15 are given by:

$$x = R \sin \alpha + r \sin \alpha \qquad (4)$$

$$y = R \cos \alpha - r \cos \alpha \qquad (5)$$

On the other hand, the following relationship exists in any triangle:

$$\sin^2 \alpha + \cos^2 \alpha = 1 \qquad (6)$$

The following formula (7) is derived from the formula (4), (5) and (6):

$$\left(\frac{x}{R+r}\right)^2 + \left(\frac{y}{R-r}\right)^2 = 1 \qquad (7)$$

The formula (7) defines an ellipse having a major axis having a length of (R+r) and a minor axis having a length of (R−r). Thus, the point P is located on the ellipse regardless of the angle $\alpha$. It is, therefore, possible to cause the auxiliary wheel 105 to move on the ellipse by positioning the wheel 105 at the point P, forming the first arm 108 and second arm 109 by the radii $R_1$ and $R_2$, respectively, and keeping the angle between the two arms 108 and 109 equal to 2 times the angle of rotation $\alpha$ of the first arm 108.

Figure 16:
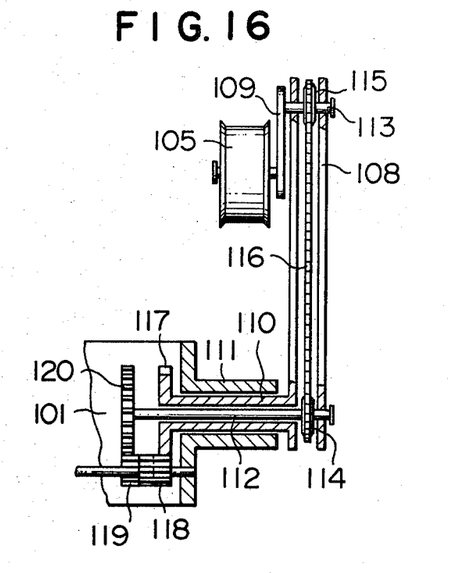
FIG. 16 is a partly sectional front elevational view of an auxiliary wheel moving means incorporated in the embodiment shown in FIGS. 11 to 13.
Figure 17:
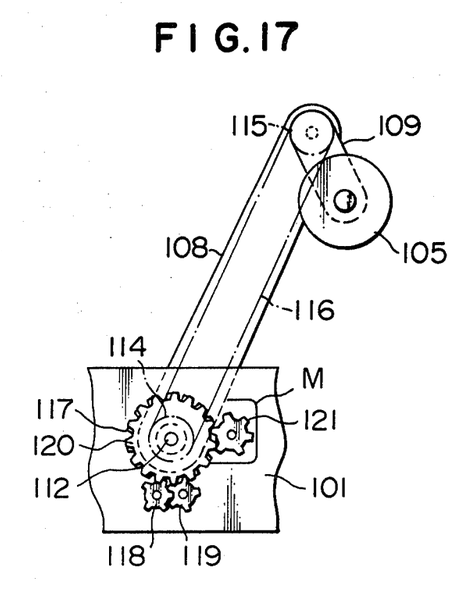
FIG. 17 is a right side elevational view of the auxiliary wheel moving means shown in FIG. 16.

This is achieved by an angular motion transmitting means which will be described hereinunder with reference to FIGS. 16 and 17.

The first arm 108 is fixed at its end to a hollow shaft 110 which in turn is rotatably mounted on the body 101 of the vehicle by a bearing 111. The hollow shaft 110 supports a rotary shaft 112 rotatably extending therethrough. The second arm 109 has a shaft 113 which is rotatably supported by the other or outer end of the first arm 108. The rotary shaft 112 and the shaft 113 of the second arm 109 respectively carry sprockets 114 and 115 which are of the same diameter and are drivingly connected by an endless chain 116 extending around the sprockets 114 and 115. Within the body 101 of the vehicle, a gear 117 fixed to the hollow shaft 110 of the first arm 108 is in meshing engagement with a first idler gear 118 which in turn is in meshing engagement with a second idler gear 119. The second idler gear 119 meshes with a gear 120 fixedly mounted on the shaft 112. The first idler gear 118 and the second idler gear 119 are equal in the number of the teeth. Similarly, the gears 117 and 120 are equal in the number of teeth. Accordingly, the rotation of the first arm 108 is transmitted to the second arm 109 through the hollow shaft 110, gear 117, idler gear 118, idler gear 119, gear 120, shaft 112, sprocket 114, chain 116 and through the sprocket 115. In addition, the angle of rotation of the second arm 109 relative to the first arm is equal to the angle of rotation of the first arm 108 relative to the vehicle body but the direction of rotation of the second arm 109 is opposite to that of the first arm 108. As shown in FIG. 17, a gear 121 is mounted on the output shaft of a motor M and meshes with the gear 117 fixed to the first arm 108. Therefore, the second arm 109 is driven automatically when the first arm 108 is driven by the motor M.

As shown in FIGS. 11 to 13, the first arm 108 and the second arm 109 are disposed laterally outwardly of the endless track 106 on each side of the vehicle and, therefore, can freely rotate about their axis without any angular limitation.

Figure 18:
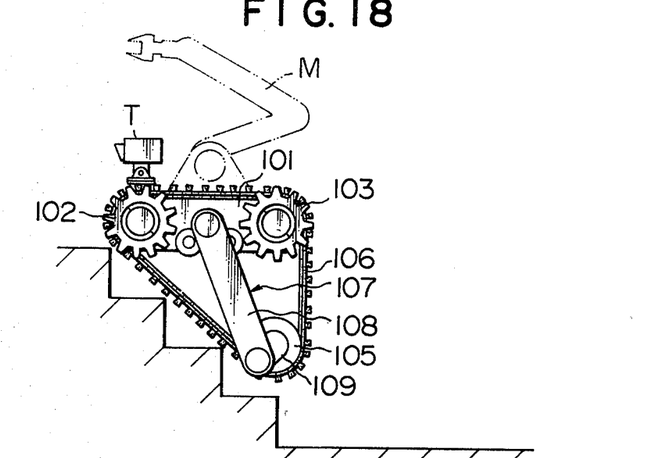
FIGS. 18 to 20 are illustrations of the vehicle shown in FIGS. 11 to 13, 16 and 17 in different positions.
Figure 19:
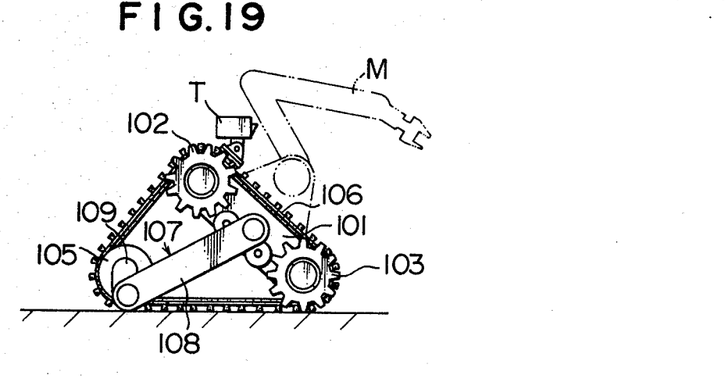
Figure 20:
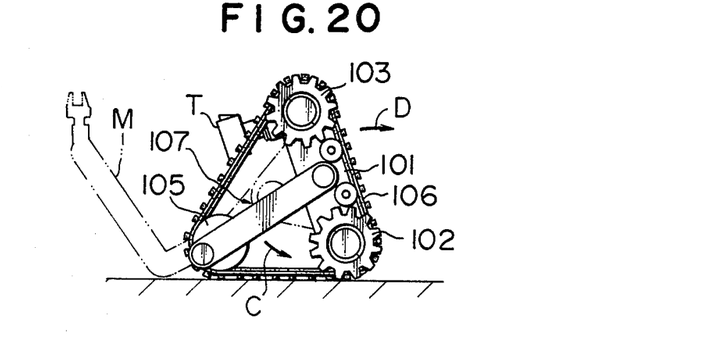

The vehicle of this embodiment operates in a manner to be described hereinunder. As in the case of the first embodiment described before, the configuration of each endless track 106 can be varied as desired by moving the auxiliary wheel 105 with respect to the driving wheel 102 and the secondary wheel 103 through pivotal movements of the first and second arms 108 and 109. Accordingly, the position of the vehicle can be controlled as desired. Namely, the vehicle can take the position which is shown in FIG. 13 and is suited for normal operation or running, whereas, in the position shown in FIG. 18, the auxiliary wheel 18 is moved to a position below the vehicle body 101 to permit the vehicle stably and safely ascend or descend stairs while the body 101 is kept substantially horizontal. Furthermore, in the position shown in FIG. 19, the vehicle body 101 is declined forwardly to facilitate any work which should be done in front of the vehicle body 101. Moreover, when the vehicle has been accidentially fallen down as shown in FIG. 20, the auxiliary wheel 105 can be moved in the direction shown by an arrow C so that the vehicle body 101 is turned or rotated about the wheel 102 in the direction shown by an arrow D to cause the vehicle body to resume the normal position.

From the foregoing description, it will be understood that the embodiment described in connection with FIGS. 11 to 20 provides superior running performance, mobility and position-controllability of the posture of the vehicle without any fear of loosening or slack of the endless tracks because the auxiliary wheel 105 on each side of the vehicle is located on an ellipse having its focal points coinciding with the positions of the axes of the driving wheel 102 and the secondary wheel 103.

What is claimed is:

1. A variable configuration track laying vehicle comprising a body, a series of wheels disposed at each side of said body and including a driving wheel rotatably mounted on said body adjacent to one of the ends thereof, a secondary wheel rotatably mounted on said body adjacent to the other end thereof and an auxiliary wheel movable relative to said body within a plane in which said driving wheel and secondary wheel are disposed, a loop of endless track extending around said driving, secondary and auxiliary wheels on each side of said body, means within said body for driving said driving wheel, and means for moving said auxiliary wheel relative to said body within said plane to vary the configuration of said loop of said endless track, said means for moving said auxiliary wheel including arm means comprising a first arm pivotally connected at one end to said body between said driving wheel and said secondary wheel and a second arm pivotally connected at one end to the other end of said first arm and rotatably supporting said auxiliary wheel at the other end of said second arm and means within said body for angularly moving said first arm relative to said body.

2. A variable configuration track laying vehicle according to claim 1, wherein said first and second arms are disposed between said endless track and the adjacent side of said body of said vehicle.

3. A variable configuration track laying vehicle according to claim 2, wherein said means for moving said auxiliary wheel further includes a slide block slidable along the length of said first arm, a link interconnecting said slide block and said second arm, and spring means urging said slide block to bias said first arm and said second arm away from each other.

4. A variable configuration track laying vehicle according to claim 1, wherein said first and second arms are disposed between laterally outwardly of said endless track.

5. A variable configuration track laying vehicle according to claim 4, wherein said one end of said first arm is connected to said body of said vehicle such that the axis of said auxiliary wheel is located on an ellipse having its focal points coinciding with the axes of said driving wheel and said secondary wheel.

6. A variable configuration track laying vehicle according to claim 5, wherein the lengths of said first arm and said second arm are so selected that the angle formed between said first arm and said second arm is two times the angle of rotation of said first arm relative to said body.

7. A variable configuration track laying vehicle according to claim 6, wherein said means for moving said auxiliary wheel further includes an angular motion transmitting means operative to regulate the angles of rotations of said first and second arms such that said second arm is rotated relative to said first arm for an angle equal to the angle of rotation of said first arm relative to said body but in the direction opposite to the direction of rotation of said first arm relative to said body.

8. A variable configuration track laying vehicle according to claim 7, wherein said angular motion transmitting means comprises a hollow first shaft fixed to said one end of said first arm, a first gear on said first shaft, a first idler gear in meshing engagement with said first gear, a second idler gear in meshing engagement with said first idler gear, a second shaft rotatably extending through said hollow first shaft, a second gear fixed to one end of said second shaft and in meshing engagment with said second idler gear, a first sprocket fixed to the other end of said second shaft, a third shaft pivotally connecting the other end of said first arm to said one end of said second arm and fixed thereto, a sprocket fixed to said third shaft, and a chain drivingly connecting said first sprocket to said second sprocket, the numbers of the teeth of said gears and sprockets being selected such that said second arm is rotated relative to said first arm for the same angle as that of said first arm relative to said body but in the direction opposite to the direction of rotation of said first arm relative to said body.

* * * * *